United States Patent [19]

Spidell

[11] Patent Number: 4,570,184
[45] Date of Patent: Feb. 11, 1986

[54] OPTIMIZATION OF VIDICON BIAS LIGHTING

[75] Inventor: Edward T. Spidell, Smithfield, R.I.

[73] Assignee: North American Philips Corporation, New York, N.Y.

[21] Appl. No.: 670,089

[22] Filed: Nov. 9, 1984

[51] Int. Cl.[4] .............................................. H04N 5/26
[52] U.S. Cl. .................................... 358/217; 358/228; 358/219
[58] Field of Search ............... 358/217, 211, 218, 219, 358/221, 222, 209, 139, 113, 228, 213, 212; 250/578; 356/229

[56] References Cited

U.S. PATENT DOCUMENTS 3,783,190  1/1974  Gaebele ............................. 358/219
3,891,795  6/1975  Johnson et al. .................... 358/211
4,302,780 11/1981  Yamazaki et al. ................. 358/228
4,423,436 12/1983  Kimura .............................. 358/98
4,537,510  8/1985  Takahasi ........................... 356/435

Primary Examiner—Gene Z. Rubinson
Assistant Examiner—Robert G. Lev
Attorney, Agent, or Firm—Robert J. Kraus

[57] ABSTRACT

Light biasing of a vidicon target is optimized to effect a consistent rate of response to instantaneous changes in the intensity of light from an object to be imaged. The optimum bias lighting level is determined by adjusting the bias lighting to a predetermined level and producing a first and second series of video frame signals representing a gray scale image focused onto the target. The difference in magnitude between a selected frame signal in the first series and one in the second series is determined and recorded. This difference determining procedure is repeated for a succession of bias lighting levels, and the bias lighting for the target is then set at the level which effected production of the smallest difference determined.

8 Claims, 6 Drawing Figures

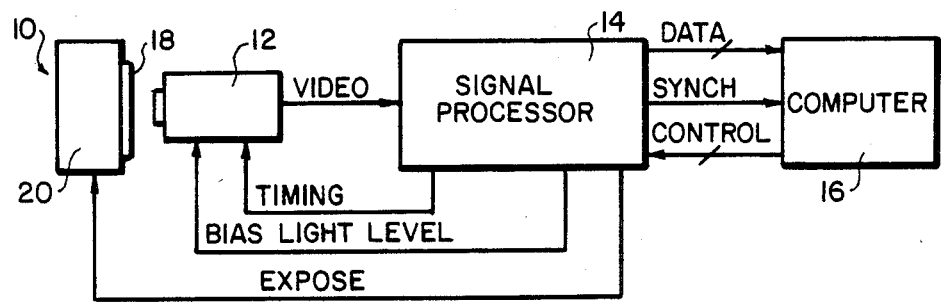
FIG.1
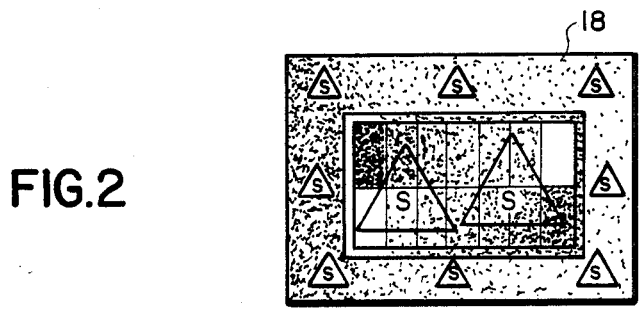
FIG.2
FIG.3
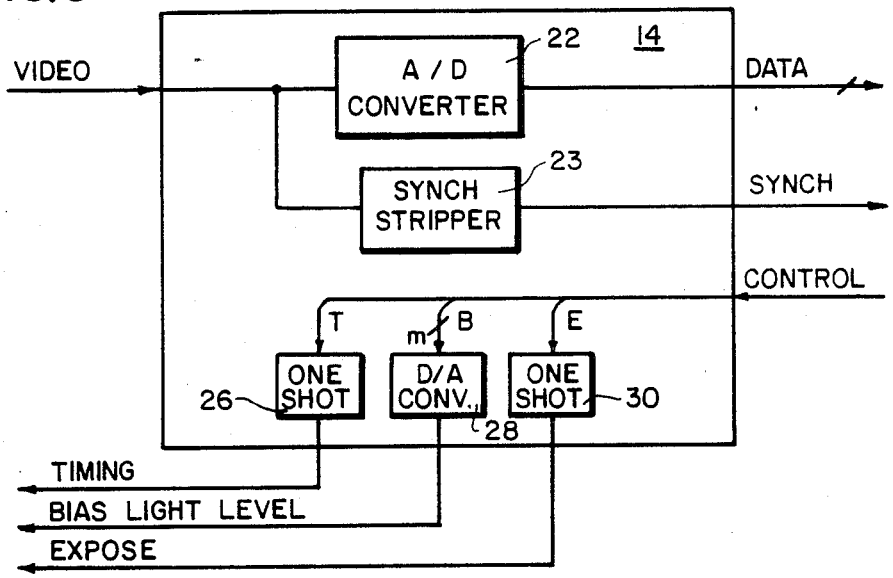

OPTIMIZATION OF VIDICON BIAS LIGHTING

BACKGROUND OF THE INVENTION

1. Field of the Invention

This invention relates to light biasing of vidicons, and in particular to the optimization of light biasing to improve vidicon performance.

2. Description of the Prior Art

Vidicons are popular camera tubes because of their ability to operate at low light levels and their ability to rapidly respond to changes in the intensity of light from an object to be imaged. The response time is limited, however, by a phenomenon known as lag. There is both a build-up lag, which is a delay in responding to instantaneous changes from lower intensity to higher intensity light, and a decay lag, which is a delay in responding to instantaneous changes from higher intensity to lower intensity light.

As is discussed in more detail in U.S. Pat. No. 4,359,759 to McBride et al., which is hereby incorporated by reference, the adverse effects of lag are most significant at low levels of incident light. At levels slightly above the dark (no light) level, an RC time constant and electron traps associated with the vidicon electron beam and its photoconductive target combine to cause an exponential delay in charging and discharging of different areas of the target in response to light intensity changes at corresponding areas of the image focused onto the target. When the vidicon is used to produce a series of video image frames in rapid succession, these delays may cause wasted frames. This typically occurs at start-up, when the intensity of image light focused onto the target suddenly increases from the dark level to a pattern of light levels corresponding to the image. Similarly, wasted frames may be produced whenever the level of light received from any significant area of the image suddenly decreases to the dark level. Wasted frames might be tolerable in some applications, but not in applications such as medical radiography where the consequence is an increase in the radiation dosage received by a patient. In such applications a patient is irradiated with x-rays during a period in which the vidicon produces a series of video image frames of a fluoroscopically-produced optical image of the x-ray radiation passing through the patient. If a number of frames are wasted as the electron charge levels on different areas of the vidicon target increase from a zero charge level to charge levels representative of the optical image focused thereon, the number of frames during which the patient is irradiated must be increased by a corresponding number.

To reduce these charging delays, vidicons are often provided with bias lighting arrangements for uniformly illuminating their targets with low intensity light radiation. These arrangements include internal bias lighting means, such as those disclosed in U.S. Pat. No. 4,259,609 to Month et al. and in other U.S. patents referred to in column 1 of the Month et al. patent, and external bias lighting means such as that disclosed in the McBride et al. patent. By illuminating the target with low intensity bias lighting before the vidicon begins to produce video frames of an image, the target is brought to an initial charge level which reduces lag and correspondingly decreases the number of wasted frames. Unfortunately, as the intensity of the bias lighting is increased to reduce lag, the vidicon sensitivity to low image intensities is reduced. Because of this decrease in sensitivity, bias lighting means frequently are not used, even in vidicons already provided with internal bias lighting sources.

The McBride et al. patent discloses a radiographic apparatus in which the target of a vidicon is momentarily pre-illuminated by a bias lighting means disposed between the target and a lens for focusing an optical image from an x-ray image intensifier onto the target. The purpose of this pre-illumination is to shorten the transient period needed for the vidicon target to charge to a linear response region. In the preferred embodiment, the bias lighting means is an annular light diffuser containing a plurality of light emitting diodes. Light emitting diodes are chosen because they can be switched off in times which are short in comparison with typical vidicon frame periods. Timer circuitry controlling the bias lighting means effects pre-illumination of the vidicon target for a predetermined period prior to irradiating the patient with x-rays to produce the optical image. Just prior to irradiation, the timer circuitry causes the bias lighting means to decrease illumination from a high pre-illumination level to a lower level, or to zero. This decrease in illumination is apparently intended to improve the sensitivity of the light biased vidicon to low level image intensities. However, the timer-controlled bias lighting arrangement disclosed complicates the radiographic apparatus in which it is used, requires a light source having a rapid switching capability, and is not usable with certain vidicons such as those which have their targets direct-coupled to image intensifiers by fiber optics or other means.

SUMMARY OF THE INVENTION

It is an object of the invention to minimize wasted video frames without using complicated bias lighting arrangements.

It is another object of the invention to minimize wasted frames without requiring that bias lighting means be interposed between the image source and the focusing lens.

In accordance with the invention, bias lighting is provided not merely to reduce lag, as is done in the prior art, but to make lag constant for any given change in image intensity. Applicant has found that for lead oxide targets a constant bias lighting level can be set which will not only enable effective use of the vidicon at low image light intensities, but will also minimize or even eliminate wasted images. It is expected that the invention will also improve the performance of vidicons having different composition targets which are subject to lag. The bias level which should be set is not predictable from the characteristic curve describing the performance of the target of any particular vidicon type, but varies from vidicon to vidicon within the same type, and even varies gradually for a specific vidicon as its target ages. It is not thoroughly understood why, but if the bias lighting is set at the level which optimizes lag in accordance with the invention, the vidicon target not only charges at a linear rate, regardless of the magnitude of a change in image light intensity, but it repeatedly charges at the same linear rate for any given change in light intensity. This repeatability is especially important in subtractive imaging where a first video frame signal representing an optical image and a subsequently produced second video frame signal representing the same optical image are electrically subtracted to produce a difference signal representing changes in the image.

Although the optimum bias lighting level for a particular vidicon is not predictable, it can be determined by a simple method whereby a bias light to be used with the vidicon is successively adjusted to produce a series of predetermined bias lighting levels. At each level the vidicon produces first and second series of video frame signals of a predefined image. Preferably this image is a pattern of different light intensities ranging from bright to dim. For each bias lighting level an early video frame signal from the first series and a late video frame signal from the second series are recorded, and the difference in magnitude between these signals is determined. The bias lighting level for that particular vidicon is then set at either the level which produced the minimum difference or, if an acceptable difference is known, the bias lighting can be set at any level which produces a difference smaller than the acceptable difference.

BRIEF DESCRIPTION OF THE DRAWING

The invention will now be described with reference to a drawing in which:

FIG. 1 is a block diagram of an exemplary arrangement for determining the optimum bias lighting setting for a vidicon target, in accordance with the invention;

FIG. 2 shows an exemplary optical image for use in the arrangement of FIG. 1;

FIG. 3 is a block diagram of an exemplary circuit which can be used to implement the signal processor shown in FIG. 1;

DESCRIPTION OF THE PREFERRED EMBODIMENTS

Figure 4:
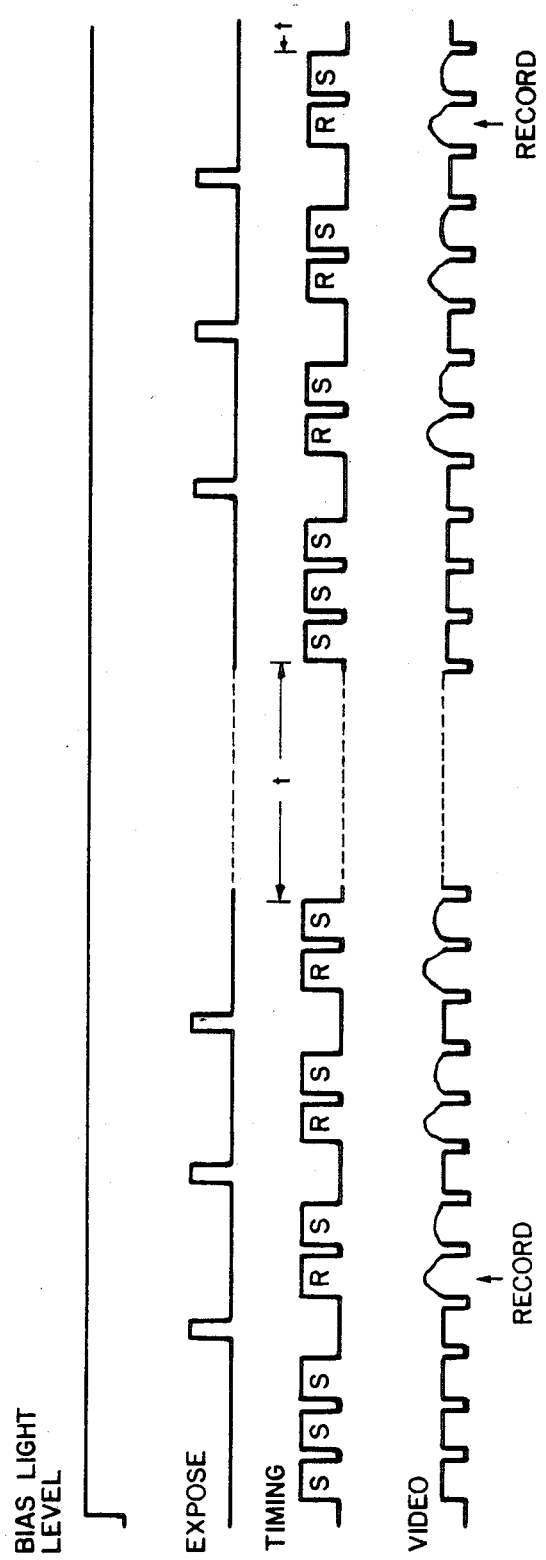
FIG. 4 is a waveform diagram illustrating signals produced by the arrangement of FIG. 1 during operation.

FIG. 1 illustrates a preferred apparatus for automatically determining the optimum bias lighting for a vidicon target in accordance with the invention. The apparatus includes an image source 10, a video camera 12, a signal processor 14 and a computer 16, all interconnected by electrical signal lines each consisting of one or more insulated signal wires. The signal lines having more than one signal wire are indicated by a slash mark.

The image source 10 includes a transparency 18 and an electrically-switchable light source 20 for producing an image such as the gray scale pattern illustrated in FIG. 2. Standard gray scale transparencies are available from Arvin Diamond and the part number of that used by applicant is 503023-1111. The light source 20 is preferably an array of parallel-wired light emitting diodes (LEDs), covered with a filter for emitting light at a wavelength for which the vidicon to be light biased is highly sensitive. Typically, vidicons are most sensitive to green light and a method in accordance with the invention has been successfully performed by using a two inch by two inch array of LEDs emitting light in the bandwidth 555-575 nanometers through a 565 nanometer optical filter covering the array. Alternatively, the light source 20 may be an unfiltered strobe light for emitting wide bandwidth radiation.

The image source 10 should produce a pattern of different light intensities ranging from at least the brightest to the dimmest intensities to which the vidicon must respond in normal use. This range can be established by selecting an appropriate transparency 18 and by either optically or electrically adjusting the intensity of light emitted by the light source 20. Switching of the light source is effected by means of an electronic switch such as a field effect transistor having a gate terminal electrically connected to a signal line for carrying an EXPOSE signal from the signal processor 14.

The video camera 12 is preferably the one in which the vidicon having its bias lighting optimized is to be used, because this enables the optimum bias lighting setting to be measured electrically at signal input and output terminals of the camera, rather than necessitating optical measurements at the target of the vidicon. These terminals include an output terminal electrically connected to a signal line for carrying to the signal processor 14 a composite analog VIDEO signal produced by the camera, and first and second input terminals electrically connected to respective signal lines for carrying to the camera a TIMING signal and a BIAS LIGHT LEVEL produced by the signal processor.

The TIMING signal is a digital signal for controlling the times at which internal camera circuitry switches on the vidicon electron beam and raster scans the electron beam across the vidicon target. The BIAS LIGHT LEVEL signal is an analog signal having a varying magnitude which causes the particular bias light arrangement used in the camera to produce predetermined levels of light incident on the surface of the target. For illustrative purposes it will be assumed that the vidicon in the camera has a bias light arrangement similar to that disclosed in U.S. Pat. No. 4,246,516 to Scholz et al, which is hereby incorporated by reference. The Scholz et al patent discloses a vidicon having an internal bias light and having circuit connections (see FIG. 4) which enable the bias light to be connected to a variable supply voltage to effect variable bias lighting.

The signal processor 14, which will be described in more detail with reference to FIG. 3, serves as an interface between the switchable light source 20, the video camera 12 and the computer 16. The computer is a conventional data processor having a multi-bit input electrically connected to a multi-wire signal line for carrying from the signal processor a digital DATA signal code (representing the images of the gray scale pattern), having a single bit input electrically connected to a single wire line for carrying from the signal processor SYNCH signal pulses (representing the frame repetition rate of the camera), and having a multi-bit output electrically connected to a multi-wire signal line for carrying to the signal processor a multi-bit CONTROL signal produced by the computer. The computer may be any data processor having sufficient memory to store selected video information represented by the DATA signal codes and having sufficient arithmetic and logical operation capability to process the stored video information, and to control the light source and the camera by means of the signal processor.

As is illustrated in FIG. 3, the signal processor includes an analog-to-digital (A/D) converter 22 for converting a portion of the analog VIDEO signal representing the image to the digital DATA signal, a synch stripper for converting a synch portion of the analog VIDEO signal to the SYNCH signal pulses, and circuitry for converting the CONTROL signal to the TIMING, BIAS LIGHT LEVEL AND EXPOSE signals which control operation of the camera and the light source. This circuitry includes circuit elements 26, 28, 30, each having an input electrically connected to one or more wires of the CONTROL signal line by a respective one of signal lines designated T, B and E.

Signal line B is an m-wire line for supplying an m-bit code portion of each CONTROL signal to circuit element 28, a digital-to-analog (D/A) converter, to effect production of a BIAS LIGHT LEVEL signal having the magnitude represented by this m-bit code. Signal lines T and E are single wire lines for applying individual pulse signals to circuit elements 26 and 30, respectively. These circuit elements are one shot circuits which respond to applied pulses by producing respective TIMING AND EXPOSE signals of predetermined durations.

Figure 5:
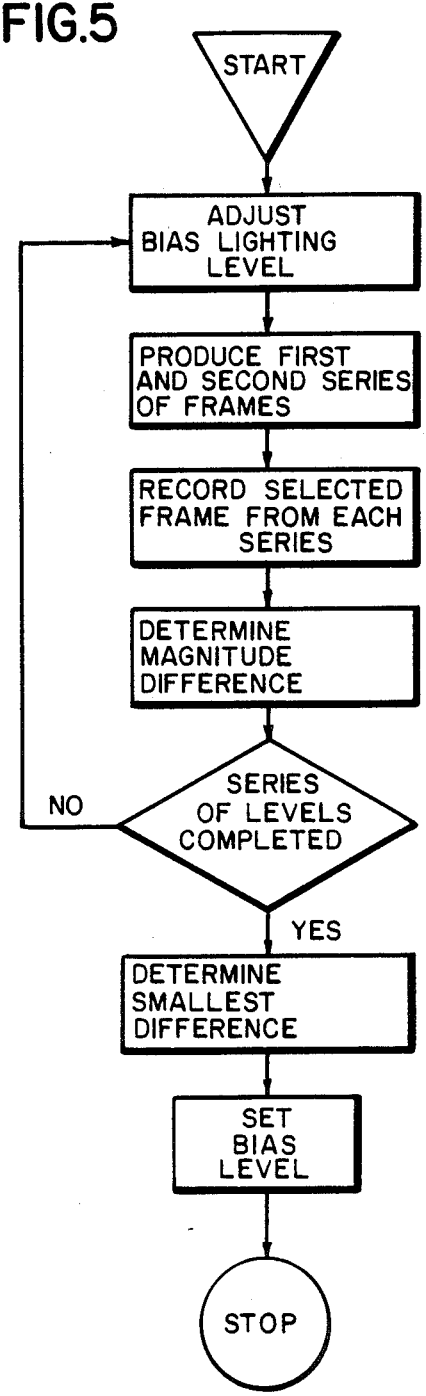
FIG. 5 is a flow diagram illustrating a first method for optimizing the bias lighting setting in accordance with the invention.

Operation of the signal processor 14 and the computer 16 to optimize the setting of bias lighting for a vidicon target can be better understood by referring to FIGS. 4 and 5. FIG. 4 illustrates exemplary waveforms of the signals produced by the camera 12 and the signal processor 14. FIG. 5 illustrates a first preferred method in accordance with the invention, including steps to be performed by the computer 16.

Before beginning operation, the camera 12 is preadjusted by optically-focusing the gray scale image produced by the source 10 onto the target, electrically-focusing the electron beam, and aligning the area covered by the rasterscanned electron beam with the target of the vidicon. Also, the computer is loaded with program material and with a plurality of m-bit codes for application to the D/A converter 28. These codes correspond to magnitudes of BIAS LIGHT LEVEL signals to be successively applied to the vidicon for adjusting the bias lighting of the target to a succession of predetermined levels. These magnitudes should range from that magnitude effecting production of bias lighting just sufficient to artificially increase the dark current of the vidicon by a factor of approximately one, to that magnitude which effects production of bias lighting sufficient to artificially increase the dark current of the vidicon to a magnitude approximately corresponding to the lowest level of light to which the vidicon should be sensitive in normal use. As used in this application "dark current" refers to the average current level of the VIDEO signal when a vidicon target in total darkness is scanned by the electron beam, and "artificial dark current" refers to the average current level of the VIDEO signal when a target illuminated only by bias lighting is scanned by the electron beam.

The difference between successive levels of artificial dark currents produced in response to the m-bit codes should be approximately equal to or less than the dark current of the particular vidicon being adjusted. These magnitudes can be determined by measuring the DC current levels produced at the video output of the camera as the magnitude of the analog BIAS LIGHT LEVEL signal is gradually increased from zero. For a typical vidicon used in radiographic applications and having a dark current of 0.5 nanoampere, the range extended from a current of approximately 1.0 nanoampere to 20.0 nanoamperes, increased in 0.5 nanoampere increments.

After it is loaded with the program material and m-bit codes, the computer 16 starts the process of determining the optimum bias lighting setting for the vidicon in the camera by transmitting to the D/A converter 28, over signal line B, the m-bit code representing the first one of the bias lighting levels. The D/A converter 28 converts this code to the corresponding BIAS LIGHT LEVEL signal magnitude, which effects adjustment of the vidicon bias lighting to the first level to be used. The computer continues transmitting the first m-bit code, thereby maintaining the first bias lighting level, while transmitting CONTROL signal pulses over signal lines T and E to effect production of first and second series of frames of the VIDEO signal, each frame representing the gray scale image focused onto the target. These CONTROL signal pulses are transmitted to the one shots 26 and 30, respectively, at times which will cause production of TIMING signal pulses and EXPOSE signal pulses effecting operation of the camera 12 and the light source 20 at a frame repetition rate and exposure rate/duration normally used in operation of the vidicon.

The EXPOSE signal pulses and TIMING signal pulses produced simulate a typical subtractive imaging operation, and are illustrated in FIG. 4. While the bias lighting is maintained at the first level, one shot 30 produces first and second series of EXPOSE signal pulses and of TIMING signal pulses. In the exemplary embodiment illustrated, three EXPOSE signal pulses and nine TIMING signal pulses are produced in each series. The EXPOSE signal pulses in each series repeatedly effects switching on of the light source 20 to expose the vidicon target to the image of the gray scale 18. Immediately preceding the first EXPOSE signal pulse in each series, one shot 26 produces three successive TIMING signal pulses, each causing the electron beam in the vidicon to raster scan the target. Immediately following each EXPOSE signal pulse, one shot 26 produces a pair of successive TIMING signal pulses, each causing the electron beam to raster scan the target. A time delay t between the last TIMING signal pulse in the first series and the first TIMING signal pulse in the second series should be sufficiently long for the computer to process the DATA signal codes produced during the first series of TIMING signal pulses. For a camera which operates in the non-interlaced mode at a maximum frame repetition rate of 10 frames per second, typical durations of the time delay t, the EXPOSE signal pulses and the TIMING signal pulses are 1 second, 15 milliseconds and 33 milliseconds, respectively.

The first TIMING signal pulse in each pair is designated the read (R) pulse and the second is designated the scrub (S) pulse. During each read pulse, the scanning electron beam effectively "erases" the charge pattern developed on the target by the immediately preceding exposure to the gray scale image, thereby effecting production of a respective frame of the analog VIDEO signal (illustrated immediately below the read pulse). During each scrub pulse, the scanning electron beam erases any residual charge remaining after the read pulse. This causes production of a miniature replica of the preceding VIDEO frame signal (illustrated immediately below the scrub pulse) which will not be used. The three TIMING signal pulses produced immediately before the first EXPOSE signal pulse are also scrub pulses. These scrub pulses erase any residual charge which has accumulated on the target before production of the first EXPOSE signal pulse in each series. This use of scrub pulses to erase the target shortly before and after each exposure of the target is a conventional practice, to ensure that the target is "clean" immediately before exposing it to an optical image.

The composite analog VIDEO signal produced by the camera, is applied to both the A/D converter 22 and the synch stripper 23. The A/D converter converts only positive going signals, and thus ignores the synch portion of the VIDEO signal, which is negative going, while converting the positive portion of the VIDEO signal to the digital DATA signal codes. Conversely, the synch stripper recognizes only negative going signals and produces a SYNCH signal pulse each time the synch portion of the VIDEO signal crosses a predetermined negative threshold.

The computer utilizes the SYNCH signal pulses and digital DATA signal codes representing selected frames of the VIDEO signal, and ignores all others. The SYNCH signal pulses are used to synchronize production of the EXPOSE and TIMING signal pulses with the frame rate at which circuitry in the camera effects raster-scanning of the electron beam. The codes representing an early frame in the first series and a late frame in the second series are recorded in the computer's memory for further processing. This enables a worst case comparison, because the earliest frames in a series are typically the least accurate representations of the optical image focused onto the target, while later frames in a series are the most accurate representations. Good results were obtained by selecting the first frame in the first series and the third frame in the second series. Each series of EXPOSE and TIMING signal pulses may be terminated immediately after recording the DATA signal codes for the selected frame in that series.

It is possible to minimize the number of DATA signal codes that must be recorded for each of the selected frames by recording only those codes which describe predefined areas of the image focused onto the target. These areas should collectively includes samples of all of the different image light levels incident on the target. For the gray scale image illustrated in FIG. 2, exemplary predefined areas are indicated by triangles.

After recording the DATA signal codes for each of the two selected VIDEO frame signals, the codes are processed during the respective period of duration t to determine the average magnitudes of the two video frame signals. This can be done by any of several known mathematical processes, such as that described in Digital Image Processing by William K. Pratt, John Wiley & Sons (1978) at pages 471-513, which is hereby incorporated by reference. The computer then computes the difference between these magnitudes and stores it its memory.

The above-described operation of transmitting CONTROL signals effecting production of VIDEO signal frames and processing the DATA signal codes representing selected frames to determine their difference in magnitude is repeated for each of the bias lighting levels represented by the m-bit codes stored in the computer. After all of these differences have been determined, they are compared to determine which one is smallest. The bias lighting for the vidicon target is then set at the level to which it was adjusted when the camera produced the smallest difference.

Figure 6:
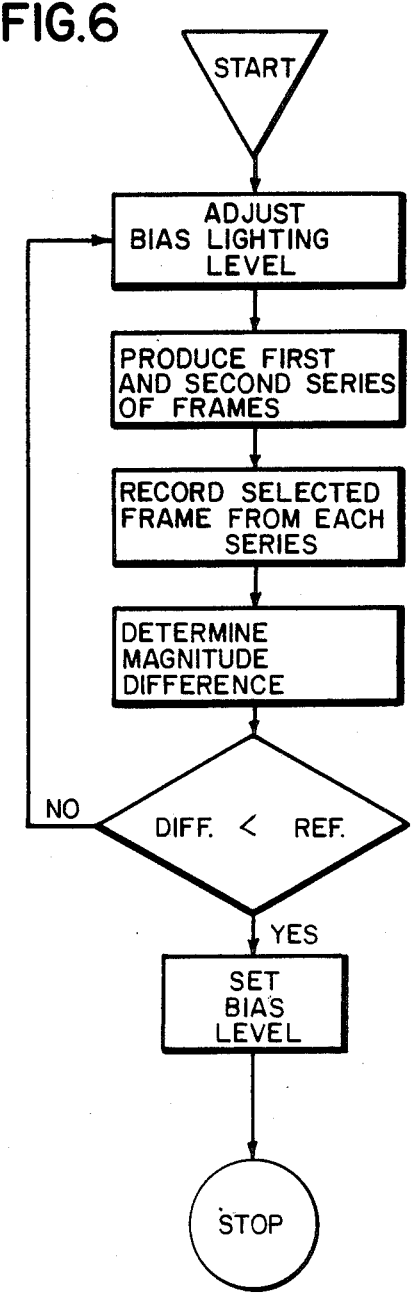
FIG. 6 is a flow diagram illustrating a second method for optimizing the bias lighting setting in accordance with the invention.

In an alternative method, represented by the flow diagram of FIG. 6, the steps for determining the frame magnitude differences for a succession of bias lighting levels are identical to those already described. After each difference is determined, however, it is compared with a reference magnitude representing an acceptable difference for the particular application in which the vidicon will be used. When a difference smaller than the reference magnitude is determined, the bias lighting is set at the level to which it was adjusted when the camera produced the VIDEO frame signals having this difference. This alternative method can be performed more quickly than that represented by the flow diagram of FIG. 5, and is useful for example, for evaluating the performance of the system. In this case, the method of FIG. 5 could be used to determine the reference magnitude.

I claim:

1. A method of optimizing the setting of bias lighting for a vidicon target, comprising:
   (a) adjusting the bias lighting to a predetermined level;
   (b) focusing a predefined image onto the target and producing, at a predetermined frame repetition rate, first and second series of video frame signals representing the image;
   (c) recording an early one of the video frame signals from the first series, and a late one of the video frame signals from the second series;
   (d) determining the difference in magnitude between the recorded video frame signals;
   (e) repeating steps a through d for a series of predetermined bias lighting levels;
   (f) determining at which of the bias lighting levels the difference in magnitude between the recorded video frame signals was smallest; and
   (g) setting the bias lighting level at the level determined in step f.

2. A method of optimizing the setting of bias lighting for a vidicon target, comprising:
   (a) adjusting the bias lighting to a predetermined level;
   (b) focusing a predefined image onto the target and producing, at a predetermined frame repetition rate, first and second series of video frame signals representing the image;
   (c) recording an early one of the video frame signals from the first series, and a late one of the video frame signals from the second series;
   (d) determining the difference in magnitude between the recorded video frame signals;
   (e) comparing said difference in magnitude with a predetermined reference magnitude; and
      (1) if the difference is larger than the reference magnitude, repeating steps a through d for a different bias lighting level, or
      (2) if the difference is smaller than the reference magnitude, performing step f;
   (f) setting the bias lighting level at the level to which it was last adjusted.

3. A method as in claim 1 or 2 where said early video frame signal is the first video frame signal in the first series.

4. A method as in claim 1 or 2 where said difference is determined by:
   (a) determining the average magnitudes of the recorded video frame signals; and
   (b) determining the difference between said average magnitudes.

5. A method as in claim 1 or 2 where said predefined image is a gray scale.

6. A vidicon having bias lighting means set to produce an optimum bias lighting level by:

(a) adjusting the bias lighting to a predetermined level;
(b) focusing a predefined image onto the target and producing at a predetermined frame repetition rate first and second series of video frame signals representing the image;
(c) recording an early one of the video frame signals from the first series, and a late one of the video frame signals from the second series;
(d) determining the difference in magnitude between the recorded video frame signals;
(e) repeating steps a through d for a series of predetermined bias lighting levels;
(f) determining at which of the bias lighting levels the difference in magnitude between the recorded video frame signals was smallest; and
(g) setting the bias lighting level at the level determined in step f.

7. A vidicon having bias lighting means set to produce an optimum bias lighting level by:

(a) adjusting the bias lighting to a predetermined level;
(b) focusing a predefined image onto the target and producing, at a predetermined frame repetition rate, first and second series of video frame signals representing the image;
(c) recording an early one of the video frame signals from the first series, and a late one of the video frame signals from the second series;
(d) determining the difference in magnitude between the recorded video frame signals;
(e) comparing said difference in magnitude with a predetermined reference magnitude; and
  (1) if the difference is larger than the reference magnitude, repeating steps a through d for a different bias lighting level, or
  (2) if the difference is smaller than the reference magnitude, performing step f;
(f) setting the bias lighting level at the level to which it was last adjusted.

8. A vidicon as in claim 6 or 7 having a lead oxide target.

* * * * *